United States Patent
Atiqullah et al.

(10) Patent No.: US 9,969,826 B2
(45) Date of Patent: May 15, 2018

(54) CATALYST COMPOSITION AND A PROCESS FOR MAKING ULTRA HIGH MOLECULAR WEIGHT POLY (ALPHA-OLEFIN) DRAG REDUCING AGENTS

(71) Applicants: Saudi Arabian Oil Company, Dhahran (SA); King Fahd University of Petroleum & Minerals, Dhahran (SA)

(72) Inventors: Muhammad Atiqullah, Dhahran (SA); Abdel Salam Al-Sarkhi, Dhahran (SA); Faisal Mohammed Al-Thenayan, Dhahran (SA); Abdullah Raddad Al-Malki, Dhahran (SA); Wei Xu, Dhahran (SA); Anwar Hossaen, Dharan (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days. days.

(21) Appl. No.: 15/349,351

(22) Filed: Nov. 11, 2016

(65) Prior Publication Data

US 2017/0145130 A1    May 25, 2017

Related U.S. Application Data

(60) Provisional application No. 62/257,357, filed on Nov. 19, 2015.

(51) Int. Cl.
  *B01J 31/00* (2006.01)
  *B01J 37/00* (2006.01)
  (Continued)

(52) U.S. Cl.
  CPC .............. *C08F 210/14* (2013.01); *F17D 1/16* (2013.01); *F17D 3/12* (2013.01); *C08F 2410/01* (2013.01); *C08F 2500/01* (2013.01)

(58) Field of Classification Search
  CPC ........ C08F 210/14; C08F 4/642; C08F 4/651; C08F 2500/01; C08F 2500/03; C08F 2410/01; F17D 1/16; F17D 3/12
  (Continued)

(56) References Cited

U.S. PATENT DOCUMENTS 3,139,418 A    6/1964  Marullo et al.
3,281,401 A   10/1966  Harban et al.
(Continued)

OTHER PUBLICATIONS

Jo et al., "Random-Graft Polymer-Directed Synthesis of Inorganic Mesostructures with Ultrathin Frameworks", Angew. Chem. Int. Ed., 2014, 53, 5117-5121, Wiley-VCH Verlag GmbH & Co.
(Continued)

*Primary Examiner* — William Cheung
(74) *Attorney, Agent, or Firm* — Dinsmore & Shohl LLP (57) ABSTRACT

A method of producing ultra high molecular weight (UHMW) $C_4$-$C_{30}$ α-olefin drag reducing agent (DRA). The method includes polymerizing in a reactor a first α-olefin monomer in the presence of catalyst and hydrocarbon solvent to produce the DRA. The catalyst consists essentially of at least one tertiary monophenyl amine having a formula $R^1R^2$N-aryl, where $R^1$ and $R^2$ are the same or different, and each is a hydrogen, an alkyl, or a cycloalkyl group, where at least one of $R^1$ and $R^2$ contain at least one carbon atom; at least one titanium halide having a formula $TiX_m$, where m is from 2.5 to 4.0 and X is a halogen containing moiety; and at least one cocatalyst having a formula $AlR_nY_{3-n}$ where R is a hydrocarbon radical, Y is a halogen or hydrogen, and n is 1-20. Further, the catalyst is absent of a carrier or support.

21 Claims, 2 Drawing Sheets

(51) Int. Cl.
*C08F 210/14* (2006.01)
*F17D 1/16* (2006.01)
*F17D 3/12* (2006.01)

(58) Field of Classification Search
USPC .......................................... 502/104, 123, 128
See application file for complete search history.

(56) References Cited

U.S. PATENT DOCUMENTS

| | | |
|---|---|---|
| 4,358,572 A | 11/1982 | Mack et al. |
| 4,384,089 A | 5/1983 | Dehm |
| 4,433,123 A | 2/1984 | Mack |
| 4,493,903 A | 1/1985 | Mack |
| 4,493,904 A | 1/1985 | Mack |
| 4,527,581 A | 7/1985 | Motier |
| 4,945,142 A | 7/1990 | Gessell et al. |
| 5,028,574 A * | 7/1991 | Gessell .................. C08F 10/00 502/104 |
| 5,229,476 A | 7/1993 | Hara et al. |
| 6,015,779 A | 1/2000 | Eaton et al. |
| 6,162,773 A | 12/2000 | Eaton et al. |
| 6,242,395 B1 | 6/2001 | Eaton et al. |
| 6,677,410 B2 | 1/2004 | Williams |
| 6,730,752 B2 | 5/2004 | Eaton et al. |
| 7,012,046 B2 | 3/2006 | Eaton et al. |
| 2003/0069330 A1 | 4/2003 | Johnston et al. |

OTHER PUBLICATIONS

International Search Report and Written Opinion dated Feb. 8, 2017 pertaining to International Application No. PCT/US2016/061817.

* cited by examiner

CATALYST COMPOSITION AND A PROCESS FOR MAKING ULTRA HIGH MOLECULAR WEIGHT POLY (ALPHA-OLEFIN) DRAG REDUCING AGENTS

CROSS-REFERENCE TO RELATED APPLICATIONS

This application claims priority to U.S. Provisional Patent Application No. 62/257,357 filed Nov. 19, 2015, which is incorporated by reference herein in its entirety.

TECHNICAL FIELD

Embodiments of the present disclosure generally relate to the production of drag reducing agents for use in hydrocarbon conduits, and more specifically relate to methods of making ultra high molecular weight poly(α-olefin) drag reducing agents.

BACKGROUND

In the petroleum industry, hydrocarbon fluids are transported through a conduit at a very high flow rate. This creates a lot of turbulence and wall friction, which cause fluid flow pressure drops. To overcome this pressure drop, a lot of mechanical energy is required. Thus, the transport of the hydrocarbon fluid is an economic challenge. Ultra high molecular weight (UHMW, molecular weight (MW)≥$10^6$) poly(α-olefin) homopolymers and copolymers, in the form of drag reducing agents (DRAs), have been used to combat this challenge. The DRAs reduce the turbulence-mediated friction and eddies, which, in turn, decrease the pressure drop. Specifically, when injected into a stream of hydrocarbon fluid flowing through a pipeline, DRAs enhance the flow of the stream by reducing the effect of drag on the liquid from the pipeline walls. This, in turn, creates better streamlining for the flow in the pipe, increases the conservation of energy, and reduces the costs of pipeline shipping.

DRAs are produced using transition metal catalytic polymerization processes; however, the catalytic activity from conventional catalysts is substandard. Moreover, other DRA synthesis processes require that the polymerization be performed at cryogenic temperatures, which is also costly and inefficient. Further, obtaining DRAs with the requisite degree of drag reduction has also been challenging.

SUMMARY

Accordingly, ongoing needs exist for improved DRAs, as well as improved processes and improved catalyst systems for synthesizing DRAs.

In one embodiment, a method of producing ultra high molecular weight (UHMW) $C_4$-$C_{30}$ α-olefin drag reducing agent (DRA) is provided. The method includes polymerizing in a reactor a first α-olefin monomer in the presence of a catalyst and hydrocarbon solvent to produce the UHMW $C_4$-$C_{30}$ α-olefin polymer DRA. The catalyst consists essentially of at least one tertiary monophenyl amine having a formula $R^1R^2$N-aryl, where $R^1$ and $R^2$ are the same or different, and each is a hydrogen, an alkyl, or a cycloalkyl group, where at least one of $R^1$ and $R^2$ contain at least one carbon atom; at least one titanium halide having a formula $TiX_m$, where m is from 2.5 to 4.0 and X is a halogen containing moiety; and at least one cocatalyst having a formula $AlR_nY_{3-n}$ where R is a hydrocarbon radical, Y is a halogen or hydrogen, and n is 1-20. Further, the catalyst is absent of a carrier or support.

In another embodiment, a catalyst is provided. The catalyst consists essentially of at least one tertiary monophenyl amine having a formula $R^1R^2$N-aryl, where $R^1$ and $R^2$ are same or different, and each is a hydrogen, an alkyl, or a cycloalkyl group, where at least one of $R^1$ and $R^2$ contain at least one carbon atom; at least one titanium halide having a formula $TiX_m$, where m is from 2.5 to 4.0 and X is a halogen containing moiety; and at least one cocatalyst having a formula $AlR_nY_{3-n}$ where R is a hydrocarbon radical, Y is a halogen or hydrogen, and n is 1-20. Further, the catalyst is absent a carrier or support.

In yet another embodiment, a method of reducing drag in a conduit is provided. The method includes producing a UHMW $C_4$-$C_{30}$ α-olefin copolymer DRA by polymerizing in a reactor a first α-olefin monomer in the presence of a catalyst and a hydrocarbon solvent. The catalyst consists essentially of at least one tertiary monophenyl amine having a formula $R^1R^2$N-aryl, where $R^1$ and $R^2$ are same or different, and each is a hydrogen, an alkyl, or a cycloalkyl group, where at least one of $R^1$ and $R^2$ contain at least one carbon atom; at least one titanium halide having a formula $TiX_m$, where m is from 2.5 to 4.0 and X is a halogen containing moiety; and at least one cocatalyst having a formula $AlR_nY_{3-n}$ where R is a hydrocarbon radical, Y is a halogen or hydrogen, and n is 1-20. The method further includes introducing the UHMW $C_4$-$C_{30}$ α-olefin polymer DRA into the conduit to reduce drag in the conduit.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

DETAILED DESCRIPTION

Embodiments of the present disclosure are directed to improved catalyst systems and a polymerization process that synthesize (UHMW) $C_4$-$C_{30}$ α-olefin polymer drag reducing agents (DRAs) with improved percentage drag reduction for a flowing hydrocarbon fluid.

Method embodiments for producing UHMW $C_4$-$C_{30}$ α-olefin polymer DRA may comprise polymerizing in a reactor a first α-olefin monomer in the presence of catalyst and hydrocarbon solvent. The UHMW $C_4$-$C_{30}$ α-olefin polymer DRA may comprise a homopolymer, copolymer, or a terpolymer. In a specific embodiment, the UHMW $C_4$-$C_{30}$ α-olefin polymer DRA is a copolymer produced by copolymerizing the first α-olefin monomer with a second α-olefin comonomer.

The first α-olefin and second α-olefin comonomers may include $C_4$-$C_{30}$ α-olefins, or $C_4$-$C_{20}$ α-olefins, or $C_6$-$C_{12}$ olefins. In one embodiment, the first α-olefin and second α-olefin comonomers are different α-olefins selected from ethylene, propylene, 1-butene, 4-methyl-1-pentene, 1-hexene, 1-octene, 1-decene, 1-dodecene, 1-tetradecene, and combinations thereof.

The solubility of DRAs in hydrocarbons is an important factor which affects the efficiency of the DRA. Without being bound by theory, DRAs produced from the combination of a short chain α-olefin (for example, a $C_2$-$C_6$ α-olefin) and a long chain α-olefin (for example, a $C_8$-$C_{12}$ α-olefin) has demonstrated improved solubility in hydrocarbons and thereby improved drag reduction efficiency. In one embodiment, the first α-olefin comonomer is 1-hexene and the second α-olefin comonomer is 1-dodecene. Various molar ratios are contemplated for the first α-olefin and second α-olefin comonomers. In one embodiment, the α-olefin monomers are 1-hexene and 1-dodecene present in a 1:4 to 4:1 molar ratio, or a 1:2 to 2:1 molar ratio, or a 1:1 mole ratio.

Embodiments of the present catalyst used in the polymerization may include a tertiary monophenyl amine, a titanium halide, and a cocatalyst. In specific embodiments, present catalyst consists of or consists essentially of the tertiary monophenyl amine, a titanium halide, and a cocatalyst. In additional embodiments, the catalyst is absent of a carrier or support.

The tertiary monophenyl amine may have the formula $R^1R^2N$-aryl, where $R^1$ and $R^2$ are the same or different, and $R^1$ and $R^2$ may each be a hydrogen, an alkyl, or a cycloalkyl group with the proviso that at least one of $R^1$ and $R^2$ contains at least one carbon atom. The aryl group may be substituted or unsubstituted. Examples of the tertiary monophenyl amine may include but are not limited to N,N-diethylaniline, N-ethyl-N-methylparatolylamine, N,N-dipropylaniline, N,N-diethylmesitylamine, and combinations thereof. In one embodiment, the tertiary monophenyl amine is N,N-diethylaniline.

The titanium halide has the formula $TiX_m$, where m is from 2.5 to 4.0 and X is a halogen containing moiety. In one embodiment, the titanium halide catalyst is crystalline titanium trichloride, for example, in the following complex $TiCl_3.1/3AlCl_3$, which is prepared by reducing titanium tetrachloride ($TiCl_4$) with metallic aluminum (Al).

The cocatalyst may be an organoaluminum compound having the formula $AlR_nY_{3-n}$ where R is a hydrocarbon radical, Y is a halogen or hydrogen, and n is 1-20. Representative examples of such organoaluminum compounds which can be used alone or in combination are trimethyl aluminum, triethyl aluminum, tri-n-propyl aluminum, tri-n-butyl aluminum, tri-isobutyl aluminum, tri-n-hexyl aluminum, tri(2-methylpentyl) aluminum, tri-n-octyl aluminum, diethyl aluminum hydride, diisobutyl aluminum hydride, diisoproyl aluminum chloride, dimethyl aluminum chloride, diethyl aluminum chloride, diethyl aluminum bromide, diethyl aluminum iodide, di-n-propyl aluminum chloride, di-n-butyl aluminum chloride, and diisobutyl aluminum chloride. In one embodiment, the cocatalyst is diethyl aluminum chloride.

Various amounts are contemplated for the catalyst components. For example, the tertiary monophenyl amine may be present in an amount of from 0.1 millimole (mmol) to 2 mmol, or from 0.25 mmol to 1 mmol, or from 0.4 mmol to 0.8 mmol, or 0.5 mmol. Moreover, the titanium halide may be present in an amount of from 0.1 millimole (mmol) to 1 mmol, or from 0.2 mmol to 0.8 mmol, or from 0.2 mmol to 0.5 mmol, or 0.25 mmol. Further, the cocatalyst may be present in an amount of from 0.2 millimole (mmol) to 5 mmol, or from 0.5 mmol to 2.5 mmol, or from 0.8 mmol to 1.5 mmol, or 1.0 mmol. The molar ratio of the cocatalyst to titanium halide may be from 1:1 to 10:1, or 2:1 to 8:1, or 3:1 to 5:1, or 4:1. Alternatively, the molar ratio of the cocatalyst to tertiary monophenyl amine may be from 1:1 to 5:1, or 2:1 to 4:1, or 2:1.

The hydrocarbon solvent may include various solvent compositions. For example, a halogenated hydrocarbon solvent such as ethylene dichloride is contemplated for the hydrocarbon solvent. Moreover, the hydrocarbon solvent may include aromatic solvents, such as toluene, or cumene. Commercial examples of suitable aromatic solvents include Koch Sure Sol® 100 and KOCH Sure Sol® 150. Other solvents may include straight chain aliphatic compounds (for example, hexane and heptane), branched hydrocarbons, cyclic hydrocarbons, and combinations thereof. As will be described in the paragraphs to follow, the addition of solvent and the timing of solvent addition may impact the final properties of the DRA.

Figure 1:
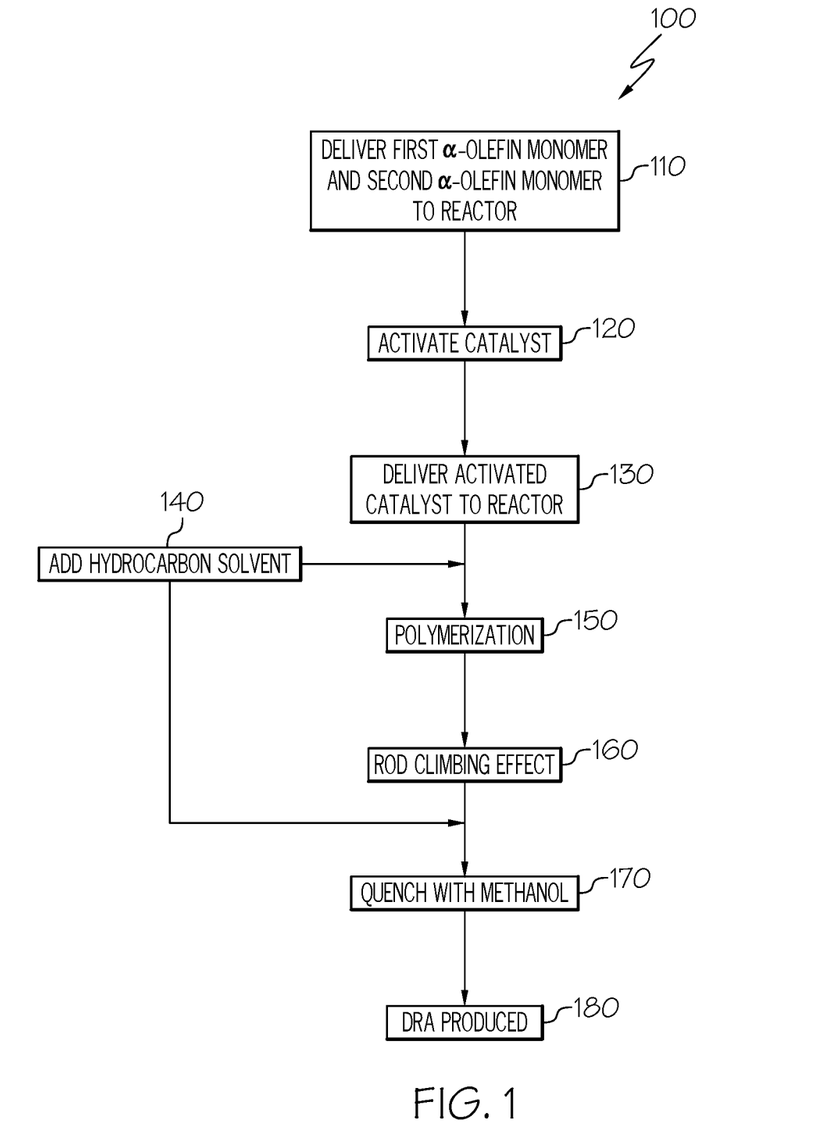
FIG. 1 is a flow chart depicting a process for making a DRA in accordance with one or more embodiments of the present disclosure.

Referring to the embodiment depicted in FIG. 1, the method 100 of producing the DRA includes the step 110 of delivering the first dried α-olefin monomer and optionally the second α-olefin monomer to a reactor or series of reactors. In specific embodiments, the reactor may include a stirring rod or a similar agitation device. In multiple embodiments, the reactor is a continuous, batch, or semi-batch stirred tank reactor. These olefin monomers may be included in the presence of solvent and optionally in the presence of a scavenger, such as triisobutylaluminum (TIBA). In specific embodiments, the reactor may be subjected to an inert gas. For example, the first α-olefin monomer and the second α-olefin may be delivered to the reactor under argon flow.

Referring again to FIG. 1, the catalyst may be activated prior to delivery to the reactor. In one embodiment, the activation step 120 may involve activating the titanium halide and cocatalyst by heating prior to delivery to the reactor. Various temperatures are contemplated, for example 30 to 60° C., or 40° C. In another embodiment, the tertiary monophenyl amine is mixed with the titanium halide and the cocatalyst during the activation step. Alternatively, the tertiary monophenyl amine may be added to the reactor separate from the titanium halide and cocatalyst either before or after the addition of activated titanium halide and cocatalyst to the reactor.

Next, the activated catalyst may be added to the reactor 130 which initiates the polymerization 150. The polymerization may occur at or less than ambient temperature. In a specific embodiment, the polymerization may occur at ambient temperature. Without being limited to specific advantages, performing the polymerization at ambient temperature reduces process costs in comparison to other conventional processes which operate under cryogenic conditions.

In yet another embodiment, the polymerization may occur in an argon atmosphere for a duration of 4 to 6 hours with a reaction temperature of 15 to 25° C. In at least one embodiment, the polymerization in argon may occur with a reaction temperature of −20 to 30° C. Further, in at least one embodiment, the polymerization time in argon may extend for a duration of 30 minutes to 12 hours. As stated previously, the reactor may be agitated by a mechanical stirring device. For example, the stirring speed may be between 400 to 900 revolutions per minute (rpm), 600 to 800 rpm, or 700 rpm.

Referring to FIG. 1, the hydrocarbon solvent 140 may be added at once, gradually, or at multiple times during the process. For example, hydrocarbon solvent may be added in bulk 142 prior to the polymerizing step 150. Alternatively, the hydrocarbon solvent may be added gradually throughout the polymerization process, or after the start of the "rod climbing effect" 160. The rod-climbing effect refers to a phenomenon resulting from mechanical stirring in the reactor when (i) the viscosity of the reaction mixture exceeds a certain critical value, and (ii) the normal forces with respect to the surface of the reaction mixture exceed the corresponding tangential forces, thereby causing the mixture to ascend or climb the stirring rod.

Referring again to FIG. 1, the reactor may be quenched with methanol 170 thereby at least partially terminating the polymerization process. At which point, the UHMW $C_4$-$C_{30}$ α-olefin DRA is produced 180. In specific embodiments, the DRA may have a non-crystalline or amorphous structure. Alternative quenching procedures are contemplated as are alternative procedures to terminate the polymerization process.

Without being bound by theory, further branching, for example, long chain branching, may enhance the solubility of the DRA. This increased branching may be quantified in part by the molecular weight distribution (MWD) metric. In one or more embodiments, the UHMW $C_4$-$C_{30}$ α-olefin copolymer drag reducing agent may have an MWD of at least 2.0, where MWD is defined as $M_w/M_n$ with $M_w$ being a weight average molecular weight and $M_n$ being a number average molecular weight. In another embodiment, the MWD may be at least 3.25. Moreover, the UHMW $C_4$-$C_{30}$ α-olefin polymer drag reducing agent has a weight average molecular weight ($M_w$) of at least $1.5 \times 10^6$ g/mol, or at least $2.0 \times 10^6$ g/mol, or at least $2.5 \times 10^6$ g/mol. The polydispersity index (PDI) may be at least 2.0.

For additional details regarding the embodiments of the present disclosure, the following examples are provided.

EXAMPLES

All the synthesis procedures and manipulations were done under inert environment using argon, standard Schlenk technique, and a glove box. Toluene, 1-hexene ($C_6$), and 1-dodecene ($C_{12}$) were dried by contacting with an activated 4 A molecular sieve at room temperature overnight. The molecular sieve was activated at 230° C.

Reference Example 1-hexene ($C_6$) and 1-dodecene ($C_{12}$) were copolymerized using a computer-interfaced, AP-Miniplant GmbH laboratory-scale reactor set-up. The reactor consists of a fixed top head and a one-liter jacketed Büchi glass autoclave. The glass reactor was baked for 2 hours (h) at 120° C. Then, it was purged with nitrogen four times at the same temperature. The reactor was cooled from 120° C. to room temperature.

Specifically, the desired volume of 1-hexene ($C_6$), dodecene ($C_{12}$), and dried toluene dissolved in 200 milliLiters (mL) of dried n-hexane and 1.0 mL of 1.0 M triisobutylaluminum (TIBA) were transferred to the reactor under mild argon flow.

The required amount of solid $TiCl_3 \cdot 1/3 AlCl_3$ dissolved in dried toluene was pre-activated with a calculated amount of diethyl aluminum chloride (DEALC) in a Schlenk flask by heating them at 40° C. for 30 minutes (min).

The whole volume of the pre-activated catalyst solution was siphoned into the reactor under mild argon flow to start polymerization for 5 hours with reaction temperature and stirrer speed set at 20° C. and 700 rpm, respectively. Additionally, 200 mL of dried toluene was added when the rod-climbing effect started. The reaction mixture was quenched by adding methanol with vigorous agitation.

Upon completion of the polymerization trial as described previously, the reactor was opened, the resulting honey-like reaction mixture was stored in a bottle, and its weight was determined. The glass reactor vessel was cleaned using technical grade toluene for the next trial.

The synthesized $C_6$-$C_{12}$ reference copolymer was characterized in terms of weight average molecular weight $M_w$ using high temperature gel permeation chromatography (GPC) (Polymer Lab GPC 220, UK).

The following table lists properties of the DRAs produced by the prior Reference Example as well as additional examples. In transition metal-catalyzed olefin polymerization, $M_w$ and catalyst productivity are approximately inversely related. However, catalyst productivity is a complex function of monomer and co-monomer concentration, macro-mixing and micro-mixing, and temperature in combination with thermodynamic, kinetic, and mass transfer limitations. Preferably, the catalyst productivity is maximized while maintaining the $M_w$ above $1 \times 10^6$ g/mol.

TABLE 1

Summary of DRA synthesis (polymerization) trials

| Synthesis Examples | Polymerization Conditions | Total monomer conversion (%) | Catalyst productivity g DRA/(g cat h) | $M_w \times 10^6$ of DRA (g/mol) | MWD |
|---|---|---|---|---|---|
| Reference example | $TiCl_4 \cdot 1/3 AlCl_3$ (pre-catalyst) was activated with DEALC cocatalyst by heating for 30 min to achieve DEALC:$TiCl_4 \cdot 1/3 AlCl_3$ having a molar ratio >1. Total reaction volume before dilution = 200 mL. Also, 200 mL of dried toluene was added after 30 min of reaction when the rod-climbing effect was observed to just develop. 1-hexene ($C_6$) was copolymerized with dodecene ($C_{12}$) at 20° C. at a given molar ratio of $C_6$:$C_{12}$. 1 mL TIBA used as scavenger. Reactor stirrer speed = 700 rpm. Polymerization trial duration = 5 h. | 38.46 | 56 | 2.37 | 3.81 |

TABLE 1-continued

Summary of DRA synthesis (polymerization) trials

| Synthesis Examples | Polymerization Conditions | Total monomer conversion (%) | Catalyst productivity g DRA/(g cat h) | $M_w \times 10^6$ of DRA (g/mol) | MWD |
|---|---|---|---|---|---|
| Example 1 | This example was conducted the same as the Reference Example, with the exception that 0.5 mmol of N,N-diethylaniline was used during the activation of the pre-catalyst. | 53.15 | 77 | 1.70 | 3.39 |
| Example 2 | This example was conducted the same as Example 1; however, 200 mL of dried toluene was added dropwise throughout the polymerization trial when the rod-climbing effect was observed to just develop. | 35.93 | 52 | 3.42 | 3.48 |
| Example 3 | This example was conducted the same as Example 1 with the following difference; 30 mL of cumene (a viscosity reducing agent) and 170 mL of toluene were added after 30 min of reaction when the rod-climbing effect was observed to just develop. | 54.38 | 79 | 2.43 | 3.82 |
| Example 4 | TiCl$_4$•⅓AlCl$_3$ and 0.5 mmol of N,N-diethylaniline were first activated for 30 min. Then, DEALC was added and activated for 30 min before feeding into the polymerization reactor. The polymerization was conducted as illustrated in the Reference Example. | 45.83 | 67 | 2.23 | 2.63 |
| Example 5 | TiCl$_4$•⅓AlCl$_3$, 0.5 mmol of N,N-diethylaniline, and DEALC were activated for 30 min before feeding into the polymerization reactor. The polymerization was conducted as illustrated in the Reference Example. | 33.90 | 49 | 2.50 | 2.08 |
| Example 6 | This example was conducted the same as Example 1; however, after 30 min (when the rod-climbing effect was observed to just develop), 0.5 mmol of benzophenone (a Lewis base) was added to the reactor. Finally, after another 5 min, 190 mL of dried toluene fed the reactor. | 21.48 | 39 | 2.63 | 3.02 |
| Example 7 | Step 1: 0.5 mmol of benzophenone reacted with DEALC for 30 min. Step 2: 0.5 mmol of N,N-diethylaniline is reacted with the benzophenone/DEALC reaction mixture for 30 min. Step 3: the final catalyst was formulated by reacting the Step 2 reaction mixture with TiCl$_4$•⅓AlCl$_3$ for 30 min. The polymerization was conducted as illustrated in the Reference Example. | 21.59 | 16 | 3.85 | 2.18 |
| Example 8 | Step 1: 0.5 mmol of N,N-diethylaniline reacted with DEALC for 30 min Step 2: 0.5 mmol of benzophenone reacted with the Step 1 reaction mixture for 30 min. Step 3: the final catalyst was formulated by reacting the Step 2 reaction mixture with TiCl$_4$•⅓AlCl$_3$ for 30 min. Step 4: The polymerization was conducted as illustrated in the Reference Example. | 11.53 | 17 | 1.85 | 2.36 |

TABLE 1-continued

Summary of DRA synthesis (polymerization) trials

| Synthesis Examples | Polymerization Conditions | Total monomer conversion (%) | Catalyst productivity g DRA/(g cat h) | $M_w \times 10^6$ of DRA (g/mol) | MWD |
|---|---|---|---|---|---|
| Example 9 | Step 1: 0.5 mmol of benzophenone and 0.5 mmol of N,N-diethylaniline were reacted with DEALC for 30 min. Step 2: the final catalyst was formulated by reacting the Step 1 reaction mixture with $TiCl_4 \cdot 1/3 AlCl_3$ for 30 min. Step 3: The polymerization was conducted as illustrated in the Reference Example. | 11.18 | 16 | 2.60 | 2.58 |
| DRA1 | Commercial as-synthesized polyisobutylene (PIB) available from Scientific Products Inc., catalog number: 040D. | | | 2.8 (viscosity average) | 3.02 |
| DRA2 | ConocoPhillips LP 100: poly(1-decene) UHMW polymer | | | 2.20 | 2.33 |

When comparing Example 1 to the Reference Example, it is clear that the addition of tertiary monophenyl amine (N,N-diethylaniline) in Example 1 improves the monomer conversion and catalyst productivity. Moreover, when comparing Example 2 to Example 3, it is clear that the addition of hydrocarbon solvent such as cumene and toluene at the beginning of the rod climbing effect as in Example 3 is better at monomer conversion and catalyst productivity than Example 2 where hydrocarbon solvent is included dropwise throughout the process. Additionally, when comparing Examples 1, 3, and 4 to the Reference Example, an increase in catalyst productivity is observed. Without wishing to be bound by theory, the higher catalyst productivity in Examples 1, 3, and 4 over the Reference Example is believed to be the result of the interaction and complexation of the precatalyst $TiCl_4 \cdot 1/3 AlCl_3$ with N,N-diethylaniline. N—N-diethylaniline is sterically and electronically hindered. The steric hindrance originates from the ethyl substituents on the N heteroatom. Similarly, the phenyl group, which is an electron-withdrawing substituent, reduced the electron density on the basic N heteroatom and introduces electronic effect. This coherent and combined steric and electronic effect increases the catalyst productivity compared to the Reference Example by playing the role of a catalyst promoter. Increased catalyst productivity results in a greater production volume and allows for a commensurate reduction in production cost.

Adjustments to the process parameters may also adversely affect the catalyst productivity. Specifically, in Example 5 the precatalyst $TiCl_4 \cdot 1/3 AlCl_3$, N,N-diethylaniline, and DEALC were all contacted together. This results in the Lewis base (N,N-diethylaniline) being available to coordinate simultaneously with both $TiCl_4 \cdot 1/3 AlCl_3$ and DEALC. This adversely affects the alkylation of $TiCl_4 \cdot 1/3 AlCl_3$ by DEALC and the subsequent creation of open coordination sites at the titanium to form active sites which results in a catalyst productivity drop. Further, in Example 2 the 200 mL of toluene was added dropwise throughout the polymerization trial unlike in the Reference Example and Examples 1, 3, and 4 where the toluene was added as a single bolus as soon as the rod-climbing effect was noted. The drop-wise addition allows the polymerization to turn highly viscous which restricts the desired macromixing and micromixing of the growing polymer chains which contain the active center with the unreacted monomer. This results in a comparative decrease in catalyst productivity. Finally, in Examples 6-9 benzophenone was added. The benzophenone decreased both the rates of propagation and termination, albeit the termination rate decreased more than the propagation resulting in a net decrease in catalyst productivity. However, reduction in catalyst productivity may result in a commensurate improvement in drag reduction performance. As such, through process adjustments, a process of forming a DRA with desirable drag reduction performance and acceptable catalyst productivity may be achieved.

Drag Reduction Tests

Figure 2:
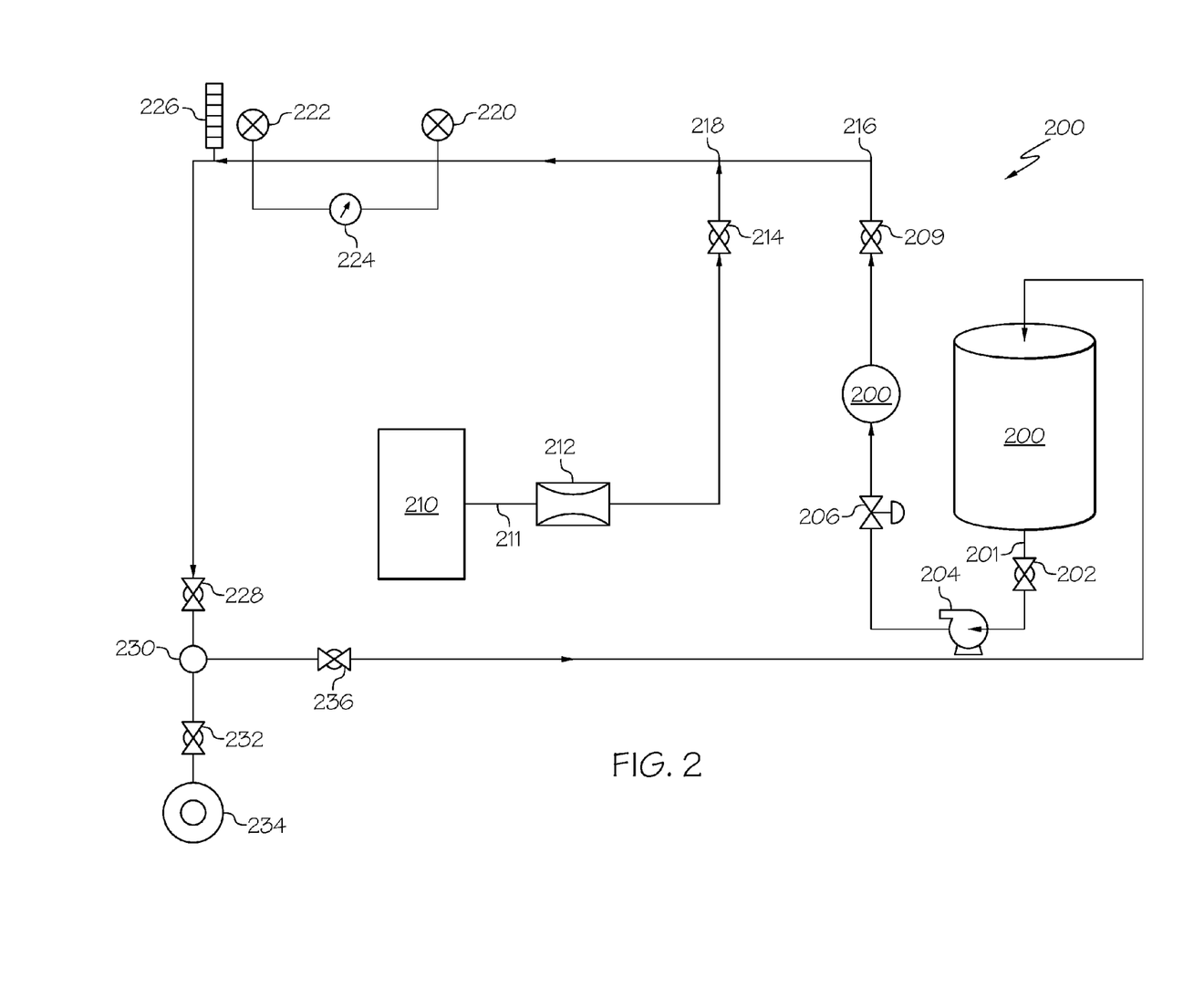
FIG. 2 is a schematic depiction of the experimental equipment set-up used to evaluate the drag reduction achieved by DRA embodiments of the present disclosure.

The drag reducing performance of the $C_6$-$C_{12}$ reference UHMW copolymer was evaluated using the experimental set-up shown in FIG. 2. This consists of a horizontal stainless steel pipeline of 0.5 inch outer diameter (OD=0.01270 m) and 0.4 inch inner diameter (ID=0.01016 m). The first pressure sensor 220 was located around 4 meters (m) from the kerosene hydrocarbon fluid inlet 216. The second pressure sensor 222 was located 1.5 m from the first pressure sensor 220. The DRA injection point 218 is located 20 cm from the kerosene fluid inlet 216. The pressure gradient was measured using a high accuracy differential pressure transducer 224 (Siemens) with a manufacturer states error of less than 0.065%. The flow of the kerosene fluid, which was stored initially in a tank 200, was delivered and controlled by ball valves 202, 209, pump 204, and flow control valve 206. The flow rate of kerosene was measured using a high accuracy vortex flow meter 208 with a manufacturer states error of less than 2%. The temperature of the liquid was measured using a resistance temperature detector (RTD) temperature sensor 226 located at the end of the test section. Downstream of the temperature sensor 226, a portion of the DRA infused kerosene fluid was separated at splitter 230 with a portion being discarded in waste tank 234 and another portion recycled to the kerosene tank 200.

Referring again to FIG. 2, the DRA polymer solution with liquid kerosene as a solvent, which were the DRAs produced in the Examples listed in Table 1, were injected into the test pipe using a diaphragm dosing pump 212. The DRA polymer solution concentration was determined using the polymer content in the reaction mixture and configured to be 120 parts per million (ppm) of DRA in the test pipe after mixing. The flow rate of the DRA polymer solution was controlled with a variable speed drive 214, lined-up with the pump 212. The pump 212 was calibrated before each experiment using different speeds. The pump speed was varied from 0 to 1,400 rpm. The pump flow rate was changed between 0.01 and 2 L/min with an accuracy of 2-4%. The DRA polymer solution was introduced into the kerosene feed at DRA injection point 218, which is a single hole at the top of the pipe having a diameter of 2 mm, located 20 cm upstream of the kerosene inlet 216.

The drag reducing performance tests of the $C_6$-$C_{12}$ reference UHMW copolymer were conducted using a kerosene flow rate of 10 L/min. This makes the average velocity of kerosene in the pipe about 2.1 m/s (6.8 ft/s) with a Reynolds number about 18,850, which indicates high turbulent flow.

The effectiveness of drag reduction is expressed by percent drag-reduction (% DR) defined as follows:

$$\% \, DR = \frac{\Delta P_{withoutDRA} - \Delta P_{withDRA}}{\Delta P_{withoutDRA}} \times 100 \quad (1)$$

where $\Delta P_{withDRA}$ and $\Delta P_{withoutDRA}$ are pressure drops with and without the drag-reducing agent, respectively.

Table 2 as follows summarizes drag reduction for the Examples of Table 1.

TABLE 2

Summary of DRA performance trials

| DRA trials | DRA concentration in the pipeline (ppm) | Level of drag reduction* (% DR) |
| --- | --- | --- |
| Reference example | 120 | 56.5 |
| Example 1 | 120 | 44.0 |
| Example 2 | 120 | 58.5 |
| Example 3 | 120 | 36.0 |
| Example 4 | 120 | 34.0 |
| Example 5 | 120 | 39.0 |
| Example 6 | 120 | 43.0 |
| Example 7 | 120 | 54.5 |
| Example 8 | 120 | 51.0 |
| Example 9 | 120 | 49.5 |
| DRA1 | 120 | 28.0 |
| DRA2 | 120 | 47.8 |

When comparing Examples 1 through 9 and the Reference Example to the commercially available DRA1, a clear improvement in the percent drag-reduction is evident. Similarly, Examples 2 and 7 through 9 when compared to the commercially available DRA2 exhibit a clear improvement in the percent drag-reduction as well. Improvement in the level of drag reduction results in a reduction in required pumping energy and a commensurate savings in electricity and associated costs.

It should be apparent to those skilled in the art that various modifications and variations can be made to the described embodiments without departing from the spirit and scope of the claimed subject matter. Thus it is intended that the specification covers the modifications and variations of the various described embodiments provided such modification and variations come within the scope of the appended claims and their equivalents.

What is claimed is:

1. A method of producing ultra high molecular weight (UHMW) $C_4$-$C_{30}$ α-olefin drag reducing agent (DRA) comprising:
   polymerizing in a reactor a first α-olefin monomer in the presence of a catalyst and a hydrocarbon solvent to produce the UHMW $C_4$-$C_{30}$ α-olefin polymer DRA, where the catalyst consists essentially of:
   at least one tertiary monophenyl amine selected from the group consisting of N,N-diethylaniline, N-ethyl-N-methylparatolylamine, N,N-dipropylaniline, N,N-diethylmesitylamine, and combinations thereof;
   at least one titanium halide having a formula $TiX_m$, where m is from 2.5 to 4.0 and X is a halogen containing moiety; and
   at least one cocatalyst having a formula $AlR_nY_{3-n}$ where R is a hydrocarbon radical, Y is a halogen or hydrogen, and n is 1-3,
   where the catalyst is absent of a carrier or support.

2. The method of claim 1 where the UHMW $C_4$-$C_{30}$ α-olefin polymer DRA is a homopolymer, copolymer, or a terpolymer.

3. The method of claim 1 where the polymerizing step involves copolymerizing the first α-olefin monomer with a second α-olefin comonomer, where the first and second α-olefin comonomers are different $C_4$-$C_{30}$ olefins.

4. The method of claim 3 where the first α-olefin comonomer and the second α-olefin comonomer comprise $C_6$-$C_{12}$ olefins.

5. The method of claim 4 where the first α-olefin comonomer is 1-hexene and the second α-olefin comonomer is 1-dodecene.

6. The method of claim 1 where the UHMW $C_4$-$C_{30}$ α-olefin polymer DRA has a non-crystalline structure.

7. The method of claim 1 further comprising activating the titanium halide and the cocatalyst prior to adding to the reactor for the polymerizing step.

8. The method of claim 7 further comprising adding the tertiary monophenyl amine to the reactor prior to the addition of activated titanium halide and cocatalyst to the reactor.

9. The method of claim 1 further comprising activating the titanium halide, the cocatalyst, and the tertiary monophenyl amine prior to adding to the reactor for the polymerizing step.

10. The method of claim 1 where the hydrocarbon solvent is added prior to the polymerizing step, throughout the polymerizing step, or at the inception of a rod climbing effect.

11. The method of claim 10 where the hydrocarbon solvent is added at the inception of the rod climbing effect.

12. The method of claim 1 where the titanium halide is reduced with metallic Al.

13. The method of claim 1 where the titanium halide is $TiCl_3 \cdot 1/3 AlCl_3$.

14. The method of claim 1 where the cocatalyst comprises one or more organoaluminum compounds selected from the group consisting of trimethyl aluminum, triethyl aluminum, tri-n-proyl aluminum, tri-n-butyl aluminum, tri-isobutyl aluminum, tri-n-hexyl aluminum, tri(2-methylpentyl) aluminum, tri-n-octyl aluminum, diethyl aluminum hydride, diisobutyl aluminum hydride, diisoproyl aluminum chloride, dimethyl aluminum chloride, diethyl aluminum chloride, diethyl aluminum bromide, diethyl aluminum iodide, di-n-propyl aluminum chloride, di-n-butyl aluminum chloride, and diisobutyl aluminum chloride.

15. The method of claim 1 where the tertiary monophenyl amine comprises N,N-diethylaniline.

16. The method of claim 1 where the polymerizing step occurs at and less than room temperature.

17. The method of claim 1 where the hydrocarbon solvent comprises one or more solvents selected from the group consisting of straight chain aliphatic compounds, branched hydrocarbons, alicyclic hydrocarbons, and aromatic hydrocarbons.

18. The method of claim 17 where the hydrocarbon solvent comprises one or more aromatic solvents.

19. The method of claim 1 where the polymerizing step occurs in an argon atmosphere for a duration of 4 to 6 hours with a reaction temperature of 15 to 25° C. and a stirrer speed of 600 to 800 rpm.

20. The method of claim 1 where the UHMW $C_4$-$C_{30}$ α-olefin polymer DRA has a molecular weight distribution (MWD) of at least 3.25, where MWD is defined as $M_w/M_n$ with Mw being a weight average molecular weight and $M_n$ being a number average molecular weight.

21. The method of claim 1 where the UHMW $C_4$-$C_{30}$ α-olefin polymer DRA has a weight average molecular weight ($M_w$) of at least $1.5 \times 10^6$ g/mol.

* * * * *